May 9, 1939.                G. C. RAUCH                2,157,217
COMBINATION MATERIAL MIXER AND MOLD
Filed March 17, 1937
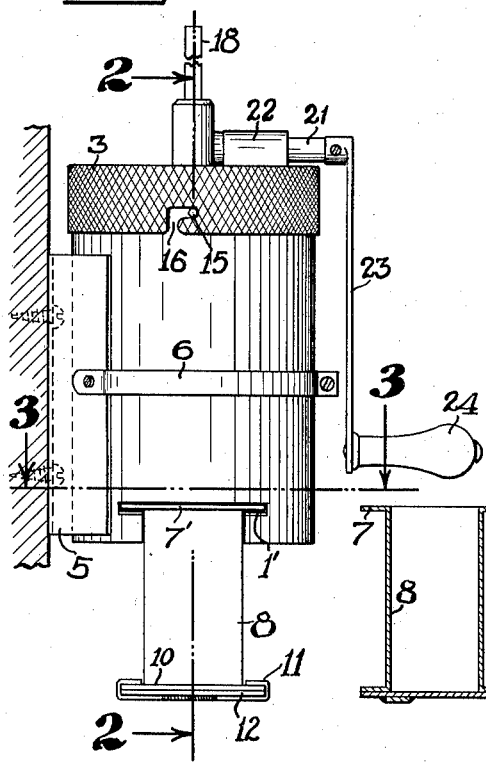
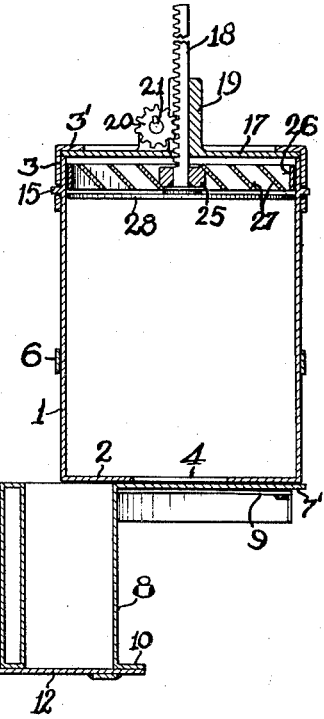
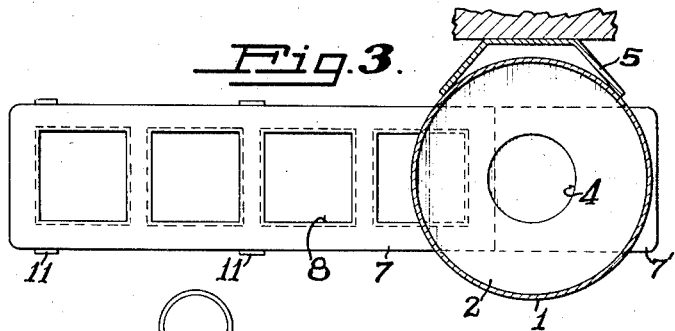
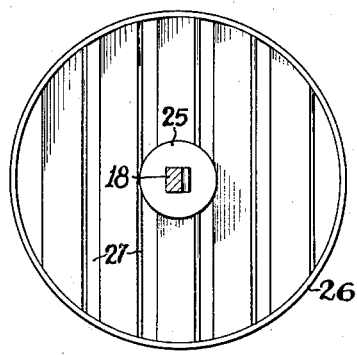
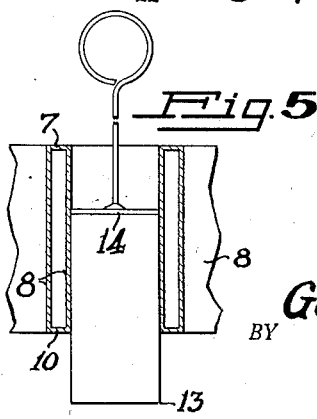
INVENTOR,
George C. Rauch
BY J. E. Dalucco
ATTORNEY Patented May 9, 1939

2,157,217

UNITED STATES PATENT OFFICE 2,157,217

COMBINATION MATERIAL MIXER AND MOLD

George C. Rauch, Salinas, Calif.

Application March 17, 1937, Serial No. 131,463

8 Claims. (Cl. 31—36)

This invention relates to an improved combination material mixer and mold.

An object of my invention is to provide an improved mixer for oleomargarine or other material.

Another object of my invention is to provide an improved material mixer, having a detachable mold associated therewith for receiving the material mixed in and discharged from the mixer.

Other and further objects of my invention will be pointed out hereinafter, indicated in the appended claims, or obvious to one skilled in the art upon an understanding of the present disclosure. For the purposes of this application I have elected to show herein certain forms of a combined material mixer and mold representative of my invention; it is to be understood, however, that the embodiment of my invention herein shown and described is for the purposes of illustration only, and that therefore it is not to be regarded as exhaustive of the variations of the invention, nor is it to be given any interpretation such as might have the effect of limiting the claims short of the true and most comprehensive scope of the invention in the art.

In the accompanying drawing:

Fig. 1 is a side elevation of a combined material mixer and mold embodying my invention;

Fig. 2 is a sectional view taken through the line 2—2 of Fig. 1;

Fig. 3 is a sectional view taken on the line 3—3 of Fig. 1;

Fig. 4 is top plan of the mixing element, showing the rack which is secured thereto in section; and Fig. 5 is a vertical section taken through one of the units of the mold.

Referring to the drawing, the numeral 1 designates a cylindrical material container having a bottom 2 and a detachable top ring 3. The bottom 2 is provided with a discharge opening 4 of suitable size and shape through which the container's contents may be expelled. The container is preferably secured to a wall bracket 5 by a band 6 or other suitable means. The discharge opening 4 in the bottom of the container 1 is normally closed during the mixing operation by an outwardly projecting flange 7' extending from a plate 7 secured to the top of a mold. The mold comprises a plurality of horizontally aligned tubular forms 8, each having a square or other suitable shape. The forms 8 are made from fairly thin sheet metal and are separated one from the other by an intervening space so as to facilitate the rapid cooling of the blocks of material located in the said forms. The tubular forms are integral with the top plate 7, and openings from the said plate into the forms permit material from the container 1 to be discharged into the said forms. The lower end of the container 1 at points beneath the bottom 2 is slotted and cut away at opposite sides thereof, as at 1', to slidably receive the top plate 7. Secured to the bottom 2 of the container 1 are spring members 9 which yieldably press against the plate 7 and normally maintain the container in a fixed position with respect to the plate 7 or its flange 7'. The spring members 9 permit the plate 7 to be slid along the container 1, which is secured to a wall, to position the forms 8 under the opening 4 so the material from the said container may be successively discharged into the forms through the opening. The tubular forms are integral at their lower ends with a bottom plate 10 which is also provided with openings of the same shape and size as the forms. Slidably held on the bottom plate 10, as by upturned strips 11, is a detachable bottom 12 for the forms 8. The detachable bottom 12 prevents the material from passing from the lower end of the forms when the latter are being filled. The removal of the bottom 12 permits the blocks of hardened material 13 to be shoved from their respective forms by a pusher 14 which is preferably of the approximate size and shape as the tubular forms.

The top ring 3 of the container is preferably knurled at its periphery so as to provide suitable grippisg means for its convenient attachment and detachment. The means preferably employed in attaching the top 3 to the container 1 comprises a pair of oppositely disposed projecting pins or members 15 secured to the container which enter irregularly shaped slots 16 in the downwardly disposed flanged part of the said top ring. The top ring 3 has an inwardly disposed annular flange 3' which extends over the outer circumferential edge of a top member 17 that closes the upper end of the container 1. The top member 17 is loosely held between the top end of the container 1 and the flange 3' of the top ring 3, and is capable of being adjusted as to position. The top member 17 is provided with a square shaped axial opening through which a vertically disposed rack 18 slidably extends. The rack also slidably extends through a vertically disposed guide member 19 secured to and extending upwardly from the top member 17. A pinion 20 secured to the inwardly disposed end of a shaft 21 engages with the rack and serves to move the latter upwardly and downwardly.

The shaft 21 is rotatably mounted in a bearing 22 secured to the upper side of the top member 17, and a crank 23 and handle 24 associated with the shaft serve to rotate the latter.

The lower end of the rack 18 is rigidly secured to the hub 25 of a mixing element. The mixing element comprises a ring 26 slidably fitting in the container 1, and a plurality of parallel inclined vanes 27 secured to and extending in the same direction across the inside of the ring. The ring 26, the vanes 27 and the hub 25 constitute a rigid construction which is capable of being moved with vertical reciprocating movement when the rack 18 is raised and lowered. The vanes 27 are preferably inclined at an angle of approximately 45 degrees with respect to the rack 18, and the teeth of the latter are disposed so that material passing from the vanes is not directed against said teeth.

In practice a quantity of oleomargarine or other material to be mixed is placed inside the container, and after the top ring 3 and the top member 17 are secured in place, the handle 24 is turned first in one direction for about two revolutions and then in the opposite direction for the same number of revolutions. When the handle is so turned the pinion 20 is also rotated, thereby moving the rack 18 and the mixing element downwardly and upwardly with reciprocating motion. After the mixing element has thus been moved through the material in the container, the top member 17 is turned through an angle of about ninety degrees so as to position the vanes 27 of the mixing element in a different position. The mixing element is thereupon again moved upwardly and downwardly. This procedure is followed until the material is thoroughly mixed. When it is desired to discharge the mixed material from the container the top ring 3, the top member 17 and the mixing element are removed, and a circular disc 28 of a size adapted to fit inside of the container 1 is placed on top of the mixed material. Thereafter the top ring, the top member and the mixing element are again placed in position on the container with the said mixing element engaging with the top side of the said disc. The container 1 is moved into a position where its discharge opening 4 is directly over the center of the particular form 8 which is closest to the flange 7'. The turning of the handle 24 in the proper direction causes the disc 28 to be pressed downwardly upon the mass of mixed material in the container, thereby causing its discharge into the said form. The material which is discharged into the form fills the corners as well as the central area of the latter. The pressure exerted by the turning of the handle forces some of the material in the form upwardly along the corners thereof and into firm engagement with the bottom of the container, thereby causing a rectangular block to be formed. The container 1 is slid along the top plate 7 to the succeeding forms 8 until each is filled with the material, after which the container is detached from the said plate and the blocks of material while in the forms are solidified by any suitable cooling process.

So as to permit moisture or air to escape from the mass of material in the container as it is pressed downwardly, the disc 28 is preferably made so its periphery does not fit tightly against the inside surface of the said container.

While I have shown a rack and pinion for reciprocating the mixing element, it is to be understood that other well known constructions may also be satisfactorily employed.

Having described my invention, what I claim is:

1. In a material mixer, a material container having a discharge opening at one end, a reciprocating member in the container for mixing material, means for reciprocating the member, and a disc mounted between the member and the material for engagement with the latter when it is desired to discharge the material from the container's discharge opening.

2. A combination material mixer and mold comprising a material container having a discharge opening in its bottom, a mold detachably secured at the bottom of the container and adapted to receive material discharged from the container, a mixing element mounted for reciprocating motion in the container, means for operating the mixing element, and means adapted to be interposed between the mixing element and the material in the container for engaging with the said material when the mixing element is moved to effect the discharge of the material through the discharge opening into the mold.

3. A combination material mixer and mold comprising a material container having a discharge opening in its bottom, a mold detachably mounted on the container and positioned to receive material discharged from the container through the discharge opening, a mixing element movably positioned in the container, and means for effecting the discharge of the mixed material from the container into the mold.

4. A combinaiton material mixer and mold comprising a material container having a discharge opening in its bottom, a plate slidably and removably mounted on the bottom of the container having a plurality of molds secured thereon, the molds being adapted to successively receive material discharged from the container, spring means engaging with the plate for normally maintaining the latter in a certain position with respect to the container whereby a mold may be held in position to receive material from the container, a mixing element mounted in the container, means for actuating the mixing element, and means for discharging the material from the container.

5. A combination material mixer and mold comprising a plate having a plurality of spaced openings and a flanged part, a plurality of molds secured to the plate and positioned beneath the openings, a material container slidably and removably mounted on and positoned above the plate having a discharge opening normally closed by the flanged part of the plate, the container being adapted to be moved along the plate so the discharge opening may be successively brought into positions over the molds, whereby the molds may be successively filled, and means for discharging the material from the container.

6. A combination material mixer and mold comprising a plate having a plurality of spaced openings and a flanged part, a plurality of molds secured to the plate and positioned beneath the openings, a material container slidably and removably mounted on and positioned above the plate having a discharge opening normally closed during the mixing operation by the flanged part of the plate, the container being adapted to be moved along the plate so the discharge opening may be successively brought into positions over the molds, whereby the molds may be successively filled, a mixing element movably mounted in the container, means for operating the mixing element, and means for effecting the discharge of material from the container.

7. In a mold, an elongated top plate having a plurality of openings therein, a plurality of spaced tubular molds secured to the top plate and positioned beneath the openings, means secured to the lower ends of the molds for maintaining the latter in spaced relation, and a detachable bottom member for normally closing the ends of the molds.

8. In a mold, an elongated top plate having a plurality of openings therein, a plurality of spaced tubular molds secured to the plate and positioned beneath the openings, a bottom plate secured to the lower ends of the molds and having openings therein which are aligned with the openings through the molds, and a removable bottom member closing the openings in the bottom plate.

GEORGE C. RAUCH.